July 21, 1970
J. B. FIELDER ET AL
3,521,020
METHOD OF BUTT WELDING TUBES
Filed June 21, 1967
10 Sheets-Sheet 1
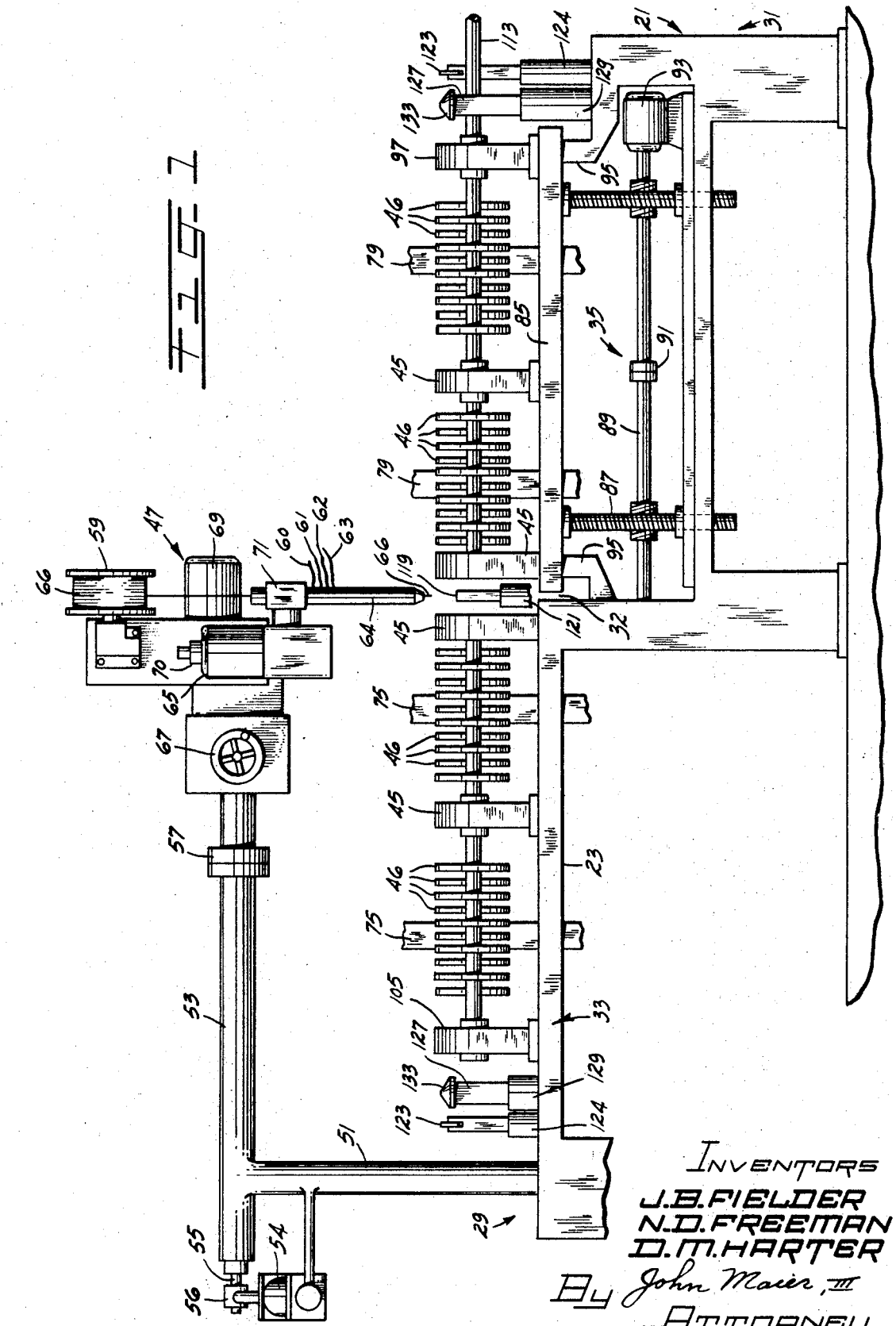
INVENTORS
J.B. FIELDER
N.D. FREEMAN
D.M. HARTER
By John Maier, III
ATTORNEY

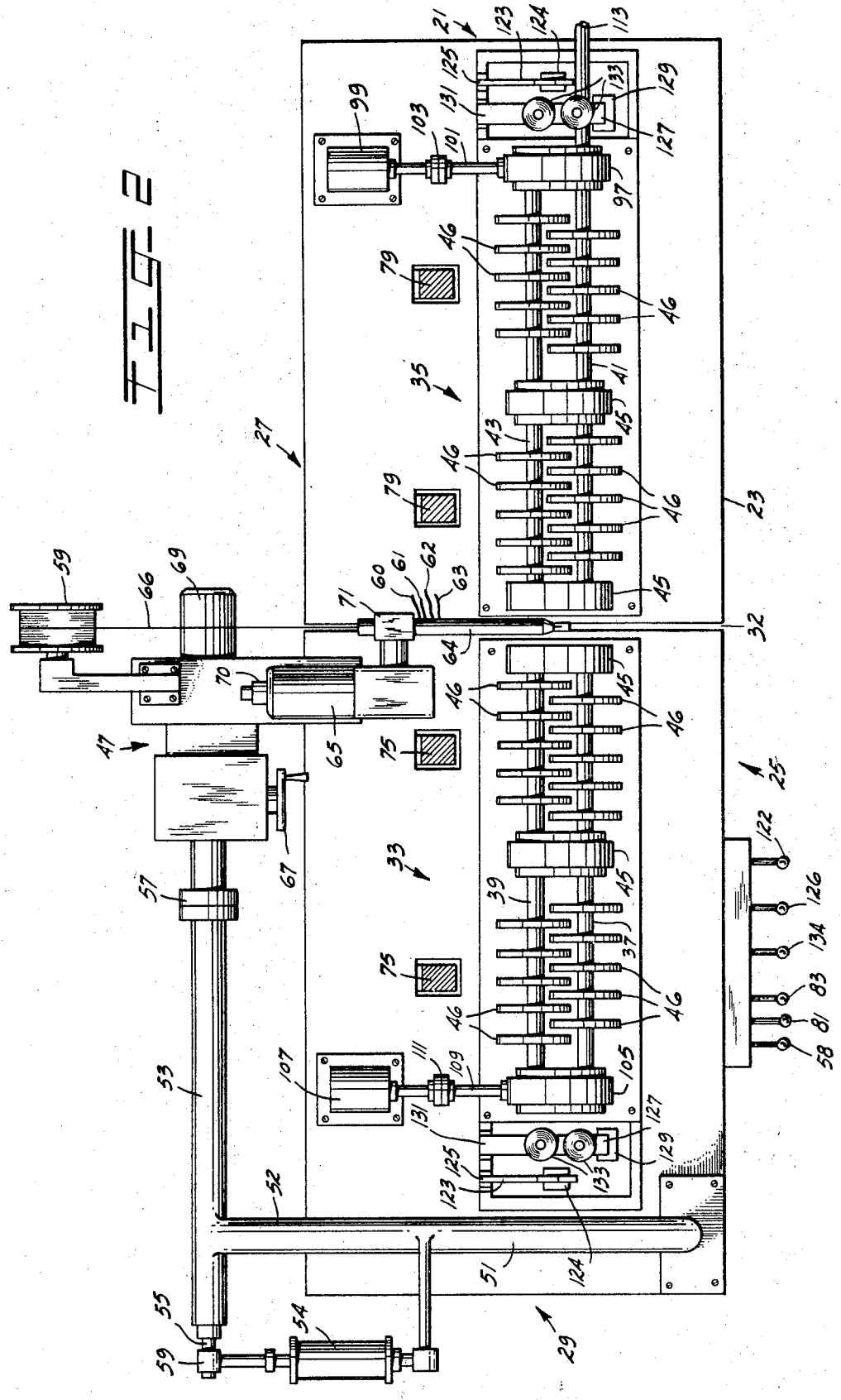

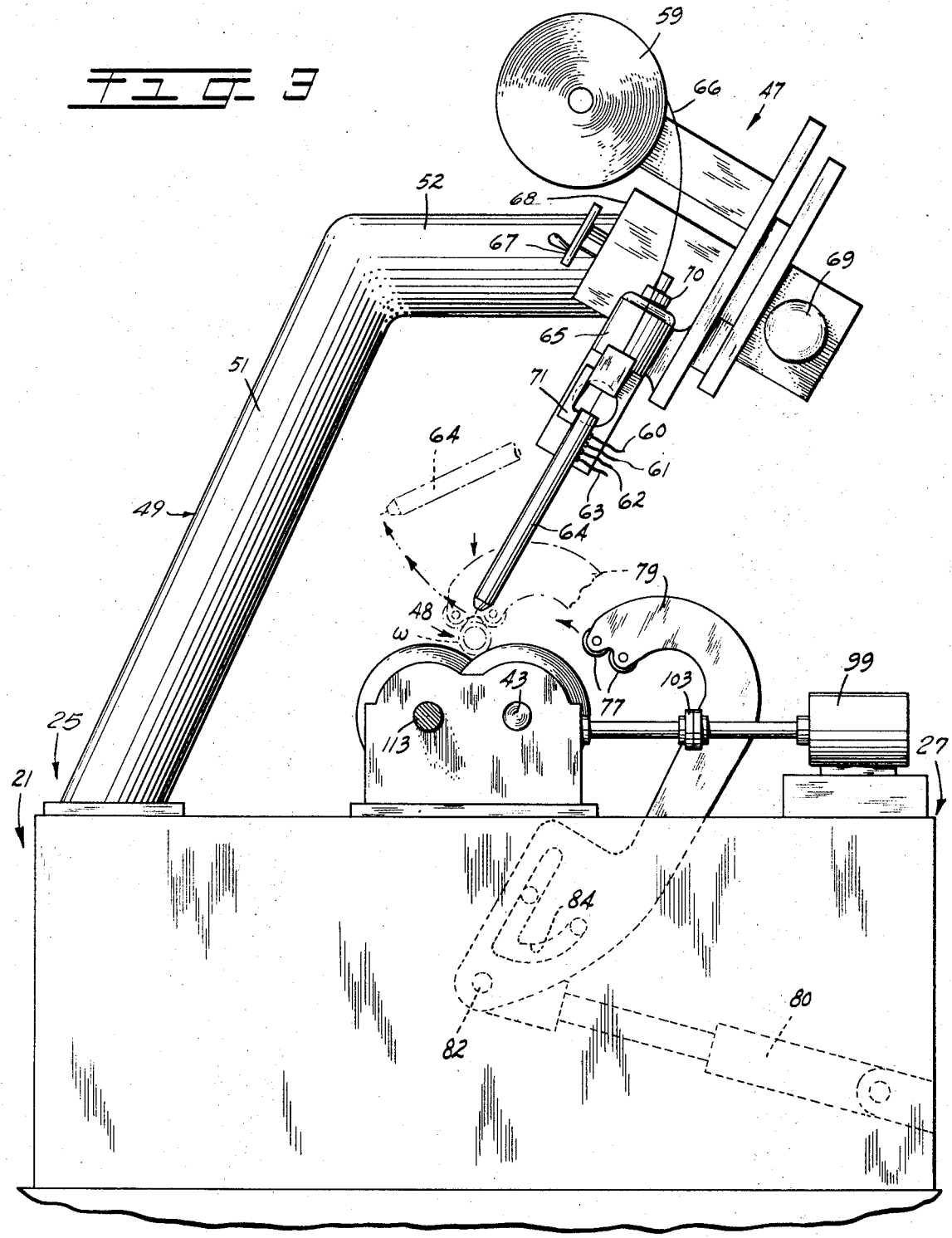

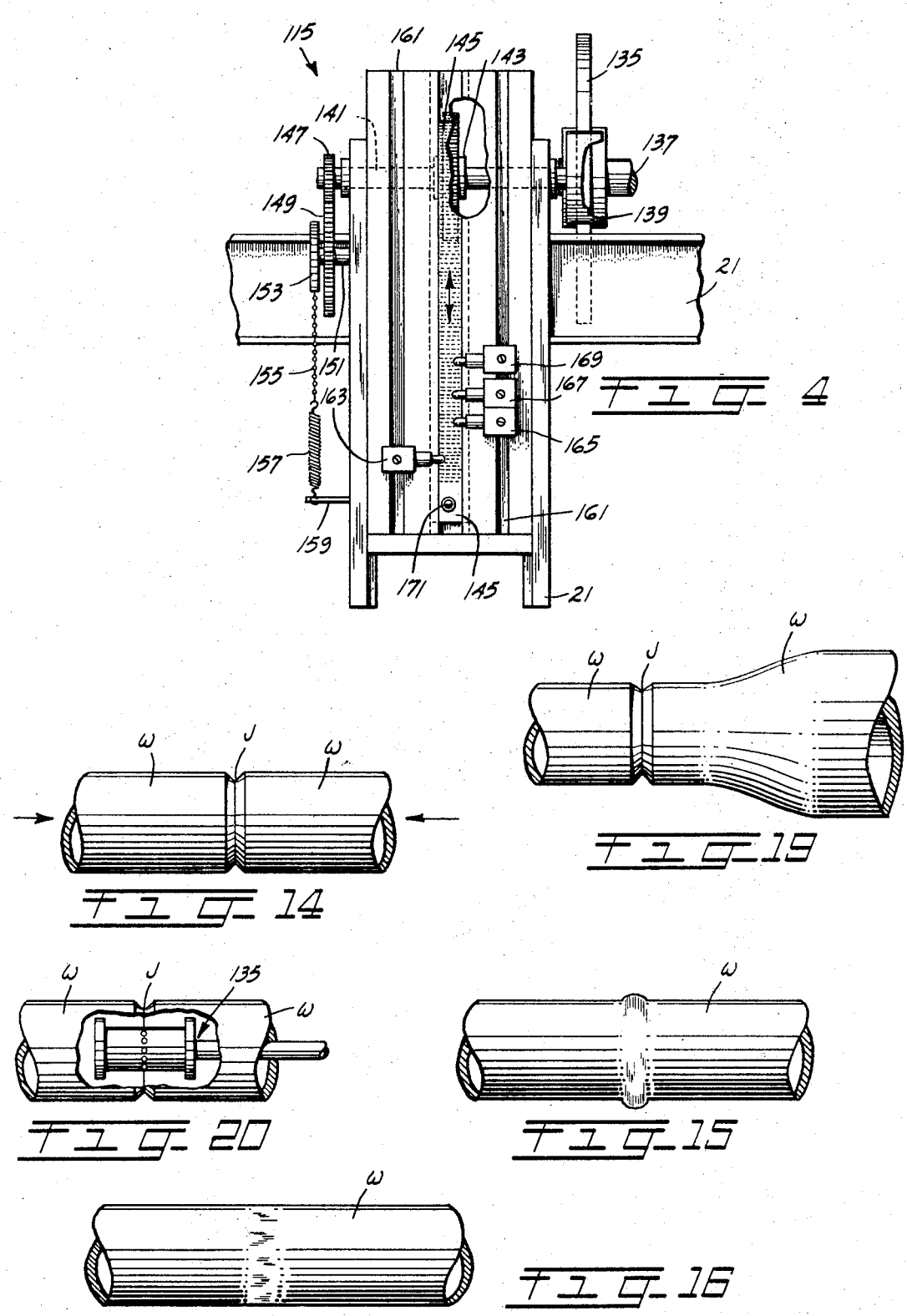

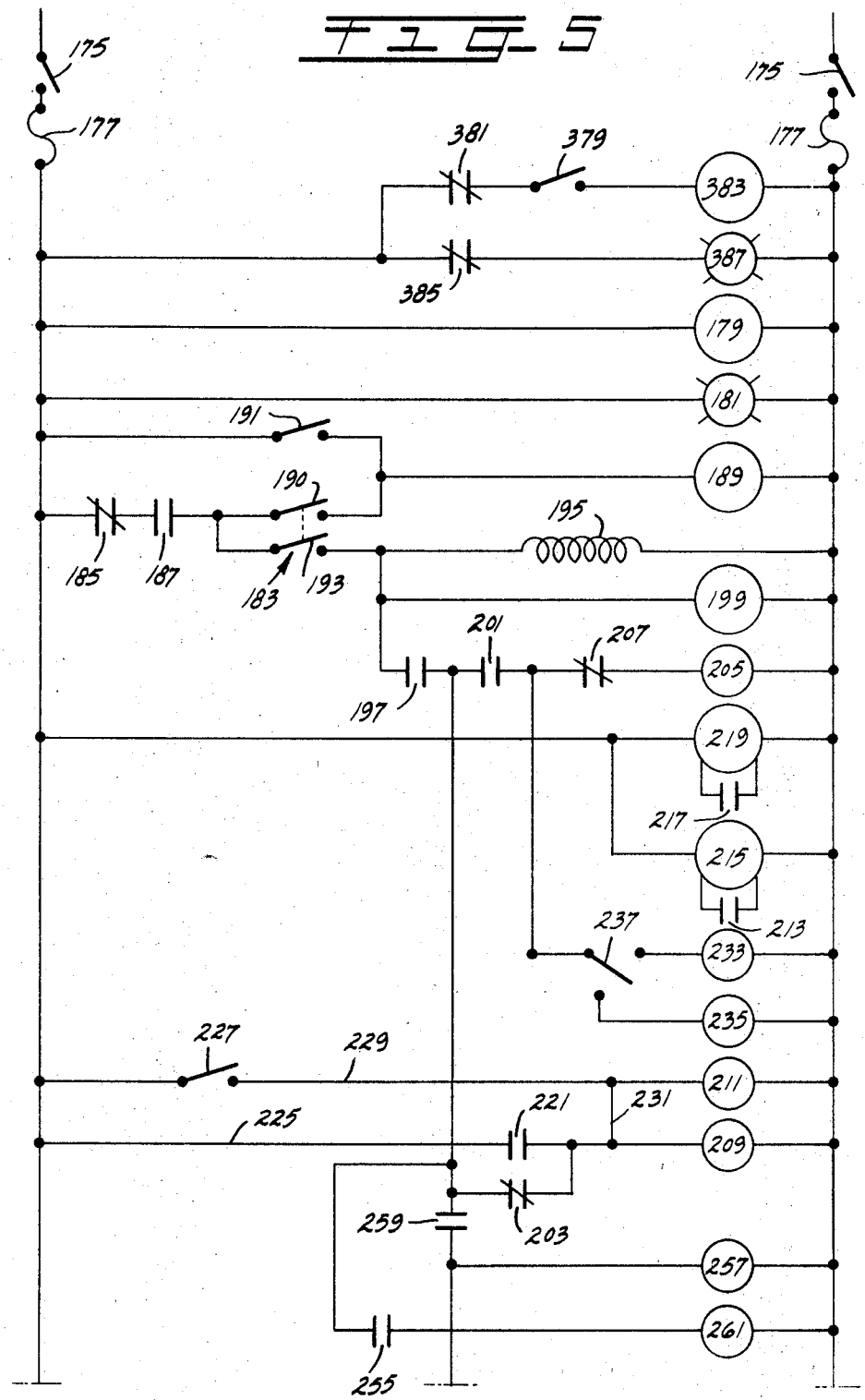

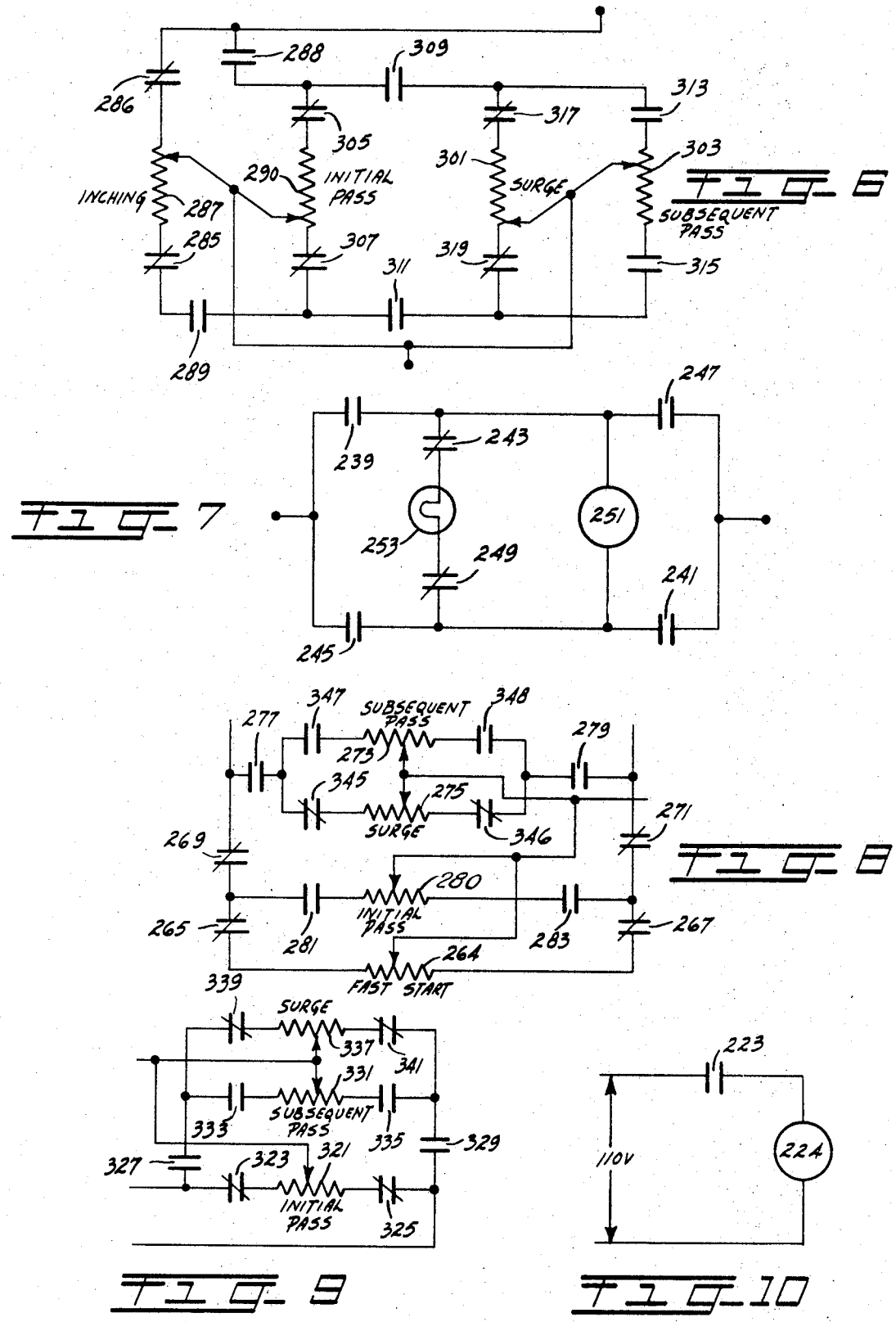

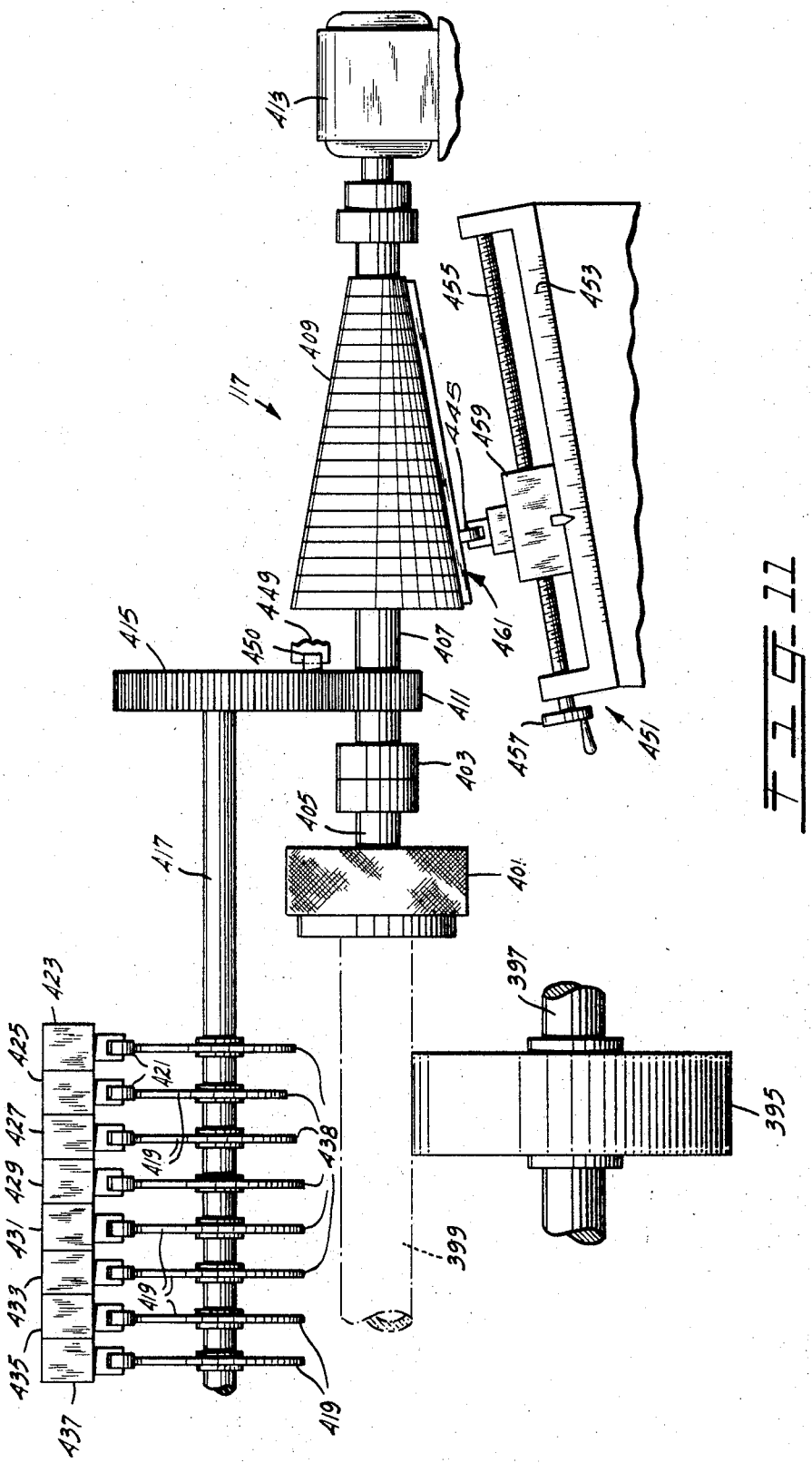

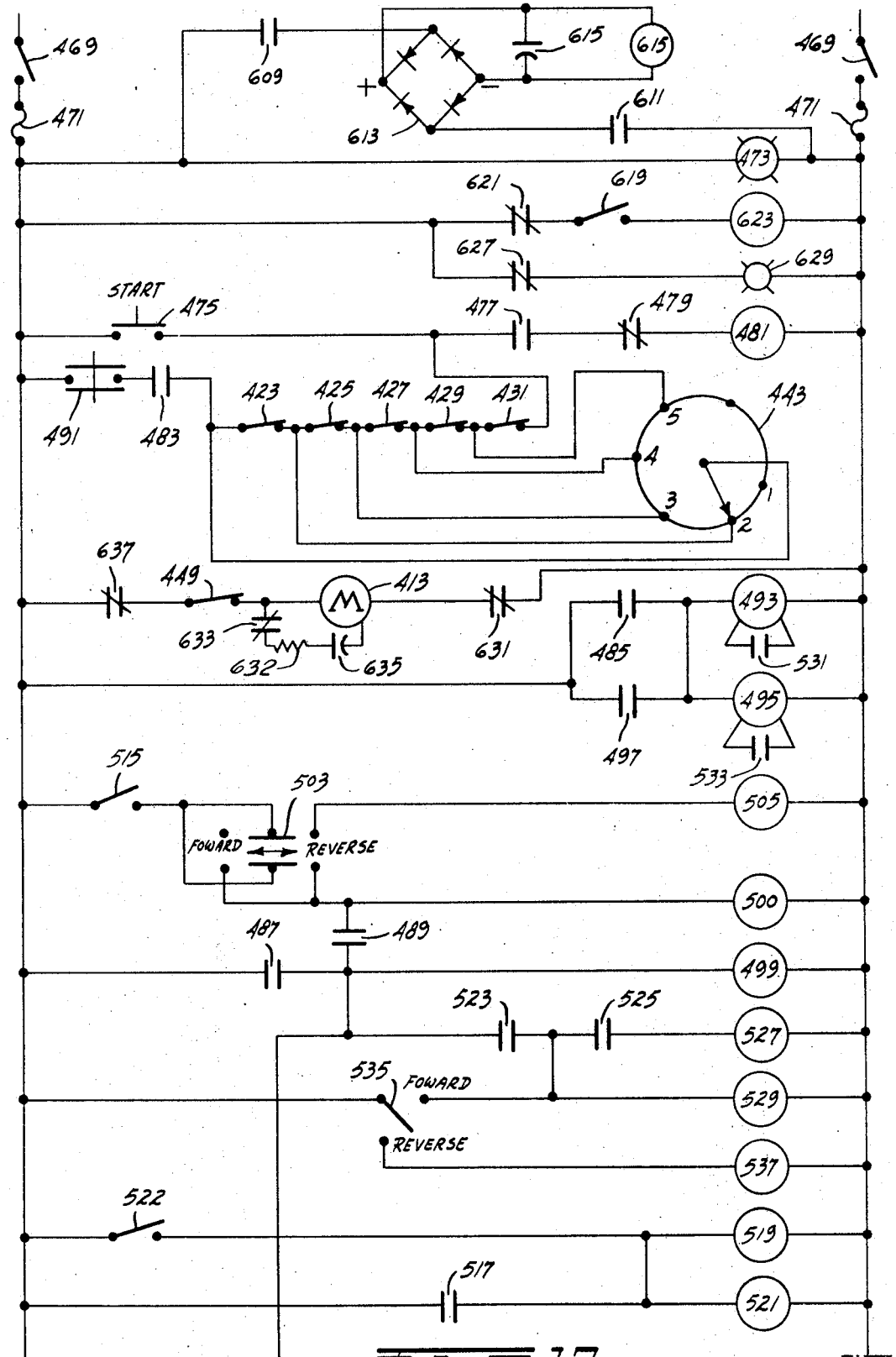

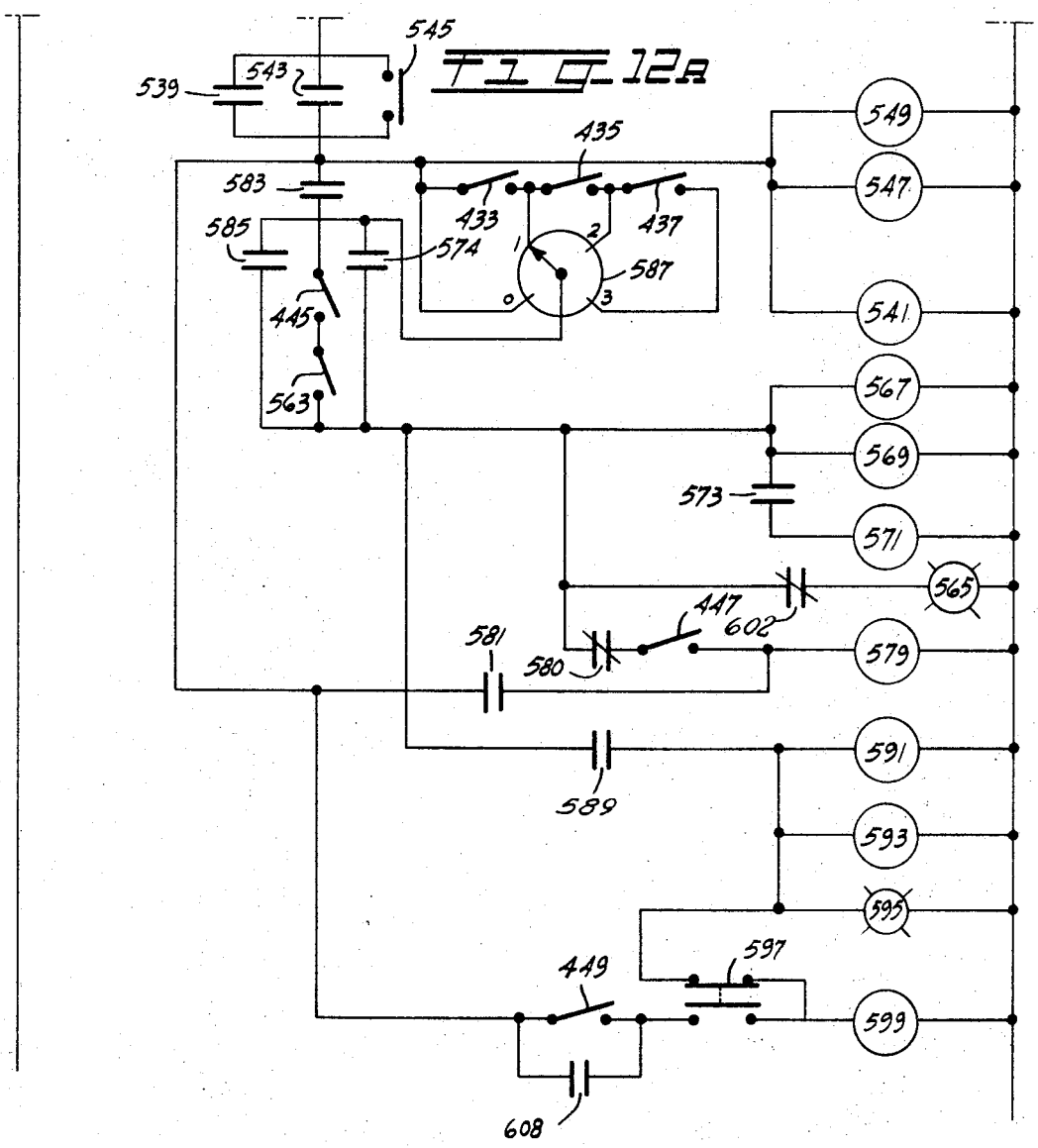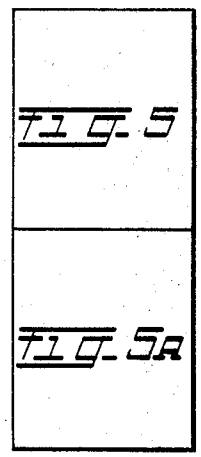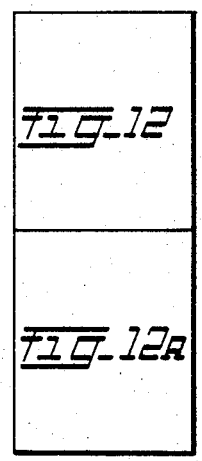

United States Patent Office 3,521,020
Patented July 21, 1970

3,521,020
METHOD OF BUTT WELDING TUBES
John B. Fielder and Norman D. Freeman, Dansville, and De Myrl M. Harter, Wayland, N.Y., assignors to Foster Wheeler Corporation, Livingston, N.J., a corporation of New York
Filed June 21, 1967, Ser. No. 647,740
Int. Cl. B23k 9/02
U.S. Cl. 219—60                                    16 Claims

ABSTRACT OF THE DISCLOSURE

Abutting tubes are mounted on rotatable rollers horizontally aligned on the surface of a worktable. A welding head assembly is mounted over the tubes. The tubes are rotated by rollers mounted on the worktable. During the rotation of the tubes, the abutting joint between the tubes is welded by the welding head. An electrical circuit provides an automatic sequence to the operation. The first pass is usually a spray arc. The workpiece is given a fast-roll start for a smooth weld start. The last weld pass or passes might be short circuit metallic transfer welds. After the first pass, a surge is used to remove any irregularity caused by the weld start. After the surge, additional spray passes may be used. Then the short circuit welds may be applied. At the conclusion of the weld, the welding power and shielding gas are retained operative after the roll and wire feed are stopped to assure a clean wire burn-off.

BACKGROUND

In the manufacture of modern vapor generators, as well as other commercial items, it is essential to have available long spans of tubing. Purchase of such long spans is not always commercially possible, requiring that long tube spans be formed from shorter tube lengths. Besides the ever present problem of reducing costs, it is vital that each weld between the tube lengths have no rough edges within the tube. Since the tubes utilized as for example in a boiler shop often vary in diameter, it is important that the apparatus utilized for forming such butt joints be adaptable to various size tubing.

SUMMARY

Tubes are mounted end to end on rotatable rollers so that the tubes may revolve during a welding operation. Metallic inert gas welding is used to weld the joint between the abutting tubes. In accordance with the preferred method of operation, the first pass utilizes a spray arc begun with a fast-roll start. Later passes, if any, may be either spray arc or short circuit arc welds depending upon the heat conditions of the workpiece. Any number of welding passes may be used in accordance with this invention. Another feature of this invention is the use of a power surge after the first pass to provide a continuous smooth transfer at the lap point. The welding power and shielding gas are retained for a brief period at the conclusion of the weld to eliminate any sticking of the electrode in the weld. An electrical circuit provides automatic operation of the device.

DESCRIPTION OF THE DRAWINGS

FIG. 1 is a front view including the welding head of the worktable showing the separation into a stationary and movable portion on which the workpiece, which may be formed of two different tube diameters is rotated;

FIG. 2 is a top plan view of the worktable shown in FIG. 1;

FIG. 3 is an end view of the worktable shown in FIG. 1 with the retractable welding head and the hold-down assemblies shown in relationship to the rotatable wheels of the worktable and the workpiece;

FIG. 4 is a front plan view showing the limit switch rack assembly in accordance with a first embodiment for incorporating the limit switches of the electrical circuit into the mechanical operation of the worktable;

FIG. 5 and FIG. 5A are a schematic representation of a control circuit for electrical operation of the worktable and welding head with the rack assembly of FIG. 4;

FIG. 6 is a schematic representation of the electrical circuitry used for control of the wire feed rate inserted into the wire feed control for the welding head to adapt it to the electrical circuitry of FIG. 5 and FIG. 12;

FIG. 7 is a schematic representation of the electrical circuitry used for reversing the wire feed inserted into the wire feed control for the welding head to adapt it to the electrical circuitry of FIG. 12;

FIG. 8 is a schematic representation of the electrical circuitry used with the roll motor speed control to adapt it to the circuitry of FIG. 5;

FIG. 9 is a schematic representation of the electrical circuitry used with the welding voltage control to adapt it to the circuitry of FIG. 5 and FIG. 12;

FIG. 10 is a schematic representation of the electrical circuitry used with the welding power source to supply welding power to the welding head in accordance with FIG. 5 and FIG. 12;

FIG. 11 is a side plan view of a limit switch control to be used with the electrical circuitry of FIG. 12;

FIG. 12 and FIG. 12A are a schematic representation of a control circuit for electrical operation of the worktable and welding head with the limit switch control of FIG. 11;

FIG. 14 is an illustration of the butt joint prior to welding;

FIG. 15 is an illustration of the weld after completion of the welding method;

FIG. 16 is an illustration of the weld after grinding;

FIG. 17 is a box diagram showing the schematic positioning of FIG. 5 and FIG. 5A;

FIG. 18 is a box diagram showing the schematic positioning of FIG. 12 and FIG. 12A;

FIG. 19 is an illustration of the butt joint between tubes of different diameter; and FIG. 20 is a view similar to FIG. 14 showing the gas purge in place.

DESCRIPTION OF THE PREFERRED EMBODIMENTS

Worktable and welding head

Figure 5A:
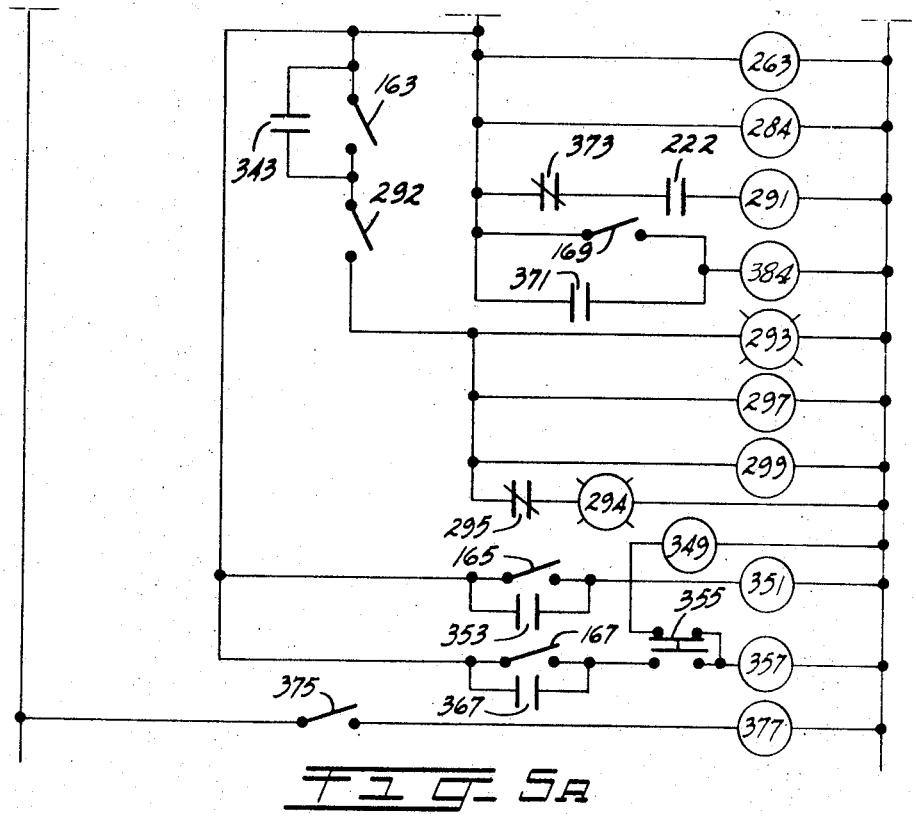

Referring now to FIGS. 1, 2 and 3, a worktable 21 is provided which includes and is supported on a fixed structural frame 23. For purposes of convenience, the side adjacent where an operator stands is referred to as the front side 25. The opposite side is referred to as the rear side 27. The end on the operator's left is referred to as the left end 29 and the opposite end is referred to as the right end 31.

The worktable 21 is split along an opening 32 running from the front side 25 to rear side 27 substantially parallel with the left and right ends 29, 31 respectively. This splits the table 21 into a left portion 33 and a right portion 35. The left portion 33 remains fixed as to its vertical position while the right portion is movable vertically. The left portion 33 includes a left front shaft 37 and a left rear shaft 39. Similarly, the right portion 35 includes a right front shaft 41 and a right rear shaft 43. The left rear shaft 39 and the left front shaft 37 as well as the right rear shaft 43 and the right front shaft 41 are supported by bearings 45. Mounted on the left and right rear shafts 39, 43 as well as on the left and right front shafts 37, 41 are rollers 46 which are made preferably of steel and have a knurled outer circumstance. A mixture of hard rubber rollers (not shown) and smooth steel rollers (not shown) may be used in place of the knurled steel rollers 46. The left and right rear shafts 39, 43 are so placed in position with the left and right front shafts 37, 41 that the rollers 46 overlap one another forming a cradle 48 between the rollers 46 on the front shafts 37, 41 and the rollers 46 on the rear shafts 39, 43 in which the two workpiece portions W to be welded together are placed.

As best seen in FIG. 2, a welding head assembly 47 is mounted on a boom 49 which includes an upright post 51, an intermediate horizontal post 52 and a horizontal post 53. A pneumatic cylinder 54, mounted at the top point of the upright post 51 and the intermediate post 52 is used to rotate the welding assembly 47 about the horizontal post 53 through a shaft 55 and crank 56 to swing the welding head 47 up from and down to the workpiece W at a joint 57. The pneumatic cylinder 54 is actuated by a pneumatic valve 58 located along the front side 25 of the worktable 21. The welding head assembly 47 includes the usual welding wire reel 59. A power cable 60, a shielding gas inlet 61, a cooling water inlet 62 and cooling water outlet 63 are mounted on a consumable electrode torch 64. A motor-driven wire drive mechanism 65 is used for feeding a welding wire 66. Added to the welding head assembly 47 is a manual centering cross feed 67 and a motor-driven vertical cross feed 68 and horizontal motor-driven cross feed 69 used for positioning the welding head 47. Attached to the armature shaft (not shown) of the wire drive mechanism 65 is a tachometer 70. The tachometer 70 is used to indicate the wire feed rate usually in inches per minute. The welding torch 64 is connected to the wire drive mechanism 65 by a swivel joint 71 that permits manual positioning of the torch 64 at any desired angle.

Mounted at the rear side 27 of the left portion 33 of the worktable 21 are a pair of left hold-down assemblies 75, each of which includes a pair of hold-down rollers 77. Similarly, at the rear side of the right portion of the worktable is a pair of right hold-down assemblies 79 also including a pair of hold-down rollers 77. Both hold-down assemblies are pivotally mounted on joints 82. The hold-down assemblies 75, 79 are brought down upon the workpiece W to hold the workpiece against the knurled rollers 46 within the cradle 48. Both pairs of hold-down assemblies 75, 79 are actuated by pneumatic cylinders 80. The pneumatic cylinders 80, which actuate the left pair of hold-down assemblies 75 are actuated by a pneumatic valve 81. The pneumatic cylinders 80 which actuate the right pair of hold-down assemblies 79 are actuated by a pneumatic valve 83. The pneumatic valves 81, 83 are located next to the pneumatic valve 58 on the front 25 of the worktable 21. As the cylinders 83 pull the hold-down assemblies 75, 79 against the workpiece W, a slotted guide 84 directs the hold-down assemblies 75, 79 in a forward direction over the workpiece W. Since the knurled rollers 46 are made of steel they serve the function of electrical conductivity, and since they are knurled, they rotate the workpiece with uniform rotational speed in relationship to their own rotational speed and therefore in a direct relationship with the front shafts 37, 41 and the rear drive shafts 39, 43. It is for this reason that the use of rubber rollers and smooth steel rollers previously mentioned will also function.

As can best be seen in FIG. 1, the right portion 35 of the worktable 21 includes a vertically movable platform 85 which is raised and lowered by a pair of worm elevating screws 87 driven by an elevating shaft 89 having a coupling 91 and elevating motor 93. Stops 95 rigidly mounted on the structural frame 23 prevent the adjustable platform 85 from lowering too far. When one workpiece portiton is smaller than the other, the smaller workpiece portion is placed on the righthand side 31 with the larger workpiece portion on the lefthand portion 33. To compensate for the difference in diameters, the adjustable platform 85 is raised. When the workpiece portions are of the same diameter, the platform 85 is placed against the stops 95. However, it should be noted that a single-level worktable (not shown) may be used in accordance with this invention except where workpiece portions W of different diameters are being used. It should be noted that this invention, although more flexible with a split worktable, is operable and often satisfactory with a fixed worktable.

The right front and rear drive shafts 41, 43 are driven by a righthand worm drive 97 which is driven by a righthand roll drive motor 99 connected to the righthand worm drive 97 by a shaft 101 and coupling 103 as best seen in FIGS. 2 and 3. In the same manner, the left front and rear drive shafts 37, 39 are driven by a lefthand worm drive 105 which is driven by a lefthand drive motor 107 connected to the lefthand worm drive 105 by a shaft 109 and coupling 111. The right and lefthand drive motors 99, 107 are electrically connected so that when the tube size of two workpiece portions W are different, the two workpiece portions W can be rotated at the same angular speed of rotation but with different peripheral speeds. The change in speed of one of the two motors 99, 107 may be accomplished by placing a variable resistor 112 (FIG. 12) in series with one of the armatures of the motors 99, 107.

The right front drive shaft 41 extends beyond the righthand worm drive 97 as seen in FIGS. 1 and 2. This extended portion 113 of the right front drive shaft 41 is used to connect the right front drive shaft 41 to one of two limit switch control assemblies 115, 117 which will be explained subsequently and are shown in FIGS. 4 and 11 respectively.

Located between the right and left portions 33, 35 of the worktable 21 is a tube stop 119 which is actuated by a pneumatic cylinder 121 (FIG. 1). The pneumatic cylinder 121 is actuated by a pneumatic valve 122 as seen in FIG. 2. When placing a workpiece W on the worktable 21, the first portion of the workpiece W is placed on the righthand portion 35 of the worktable 21 against the tube stop 119 in its raised position and then clamped by the righthand hold-down assemblies 79. The tube stop 119 is then withdrawn by the pneumatic cylinder 121 and the other portion of the workpiece W is butted against the first portion of the workpiece W and clamped down by the lefthand hold-down assemblies 75 to form a joint J between the workpiece portions W as shown in FIGS. 14, 19 and 20.

At the extreme left and right ends 29, 31 of the worktable 21 are roll-off bars 123 which are actuated by pneumatic cylinders 124. The roll-off bars 123 are pivotably mounted on a pivot joint 125 at the rear 27 of the worktable 21. The pneumatic cylinders 124 are actuated by a pneumatic valve 126. When a workpiece W has been completed, the roll-off bars 123 are moved upward about the pivot joint 125 to roll the workpiece W off the rollers 46. Inside the roll-off bars 123 are cone roller bars 127 which are also actuated by pneumatic cylinders 129 and are also pivotably mounted on a pivot joint 131 at the rear side 27 of the worktable 21. Two cones 133 are rotatably mounted on each cone roller bar 127. When the cone roller bars 127 are raised up they engage the workpiece between the two cones 133 and permit easy sliding of the workpiece W horizontally. The pneumatic cylinders 129 are actuated by a pneumatic valve 134.

As seen in FIG. 20, a gas purge assembly 135 is shown located with workpiece W. The gas purge assembly 135 is connected to a source of purge gas (not shown). Purge gas is utilized for the first or root pass only.

METHOD

Once the workpiece W is mounted on the worktable 21 and clamped in position with the welding head 47 lowered to the welding position, the welding operation can begin. Besides a shielding gas, the purge gas as shown in FIG. 20 may be inserted into the interior of the workpiece, which prevents oxidation of the interior of the weld.

As stated previously, one advantage of this invention is a flaw free connection obtained by an open-root weld meaning that no backing ring insert or other support means is utilized in the weld. For approximately the first one-eighth inch of weld as the weld begins, the relatively low temperature of the workpiece in the arc initiating area causes inadequate weld penetration to the root of the weld joint. At the arc initiating point, the workpiece W is usually rolled faster than the first pass roll speed, so as to form a smooth weld introduction but not yet to achieve the required weld penetration. The fast roll start is timed so that it covers only a minor portion of the circumferential surface of the butt joint usually between one-eighth inch and one-quarter inch. At the conclusion of the fast roll start, the workpiece W is rotated one full revolution which is referred to as the first pass. The first pass is preferably a spray arc. As is known, in gas-shielded metal arc welding a spray arc creates deeper penetration and greater deposition of weld materials than a short circuiting arc weld, but with higher heat input. Since the workpiece W is cold at the outset of the operation, a spray arc is possible for at least the first pass. On heavy and larger workpieces W, additional spray arc passes may be used before switching to a short circuiting type metal transfer weld.

Regardless of the nature of the second pass, a surge oparation follows the first pass. The surge is applied to that portion of the weld joint which was welded during the fast start operation. Its purpose is to create the necessary increase in penetration at the weld start while burning through the weld deposit formed during the fast roll start thereby forming a smooth lap with complete and continuous root bead fusion of the joint form a smooth lap. The surge which is brief in time and also only covers a small portion of circumferential weld distance approximately more than twice the length of the fast roll start is characterized by an increase in the wire feed rate resulting in an increase in welding current. The roll speed during the surge may vary in either direction from either the first pass or the second pass roll speed depending on welding conditions. Generally, a heavy and larger workpiece W will require a slower surge roll speed than a lighter and smaller workpiece.

Following the surge, at least one more pass is usually applied. Spray arc passes are continued unless heat and a tendency for the weld metal to flow are a problem. Under these circumstances, a short circuiting weld is used. On occasion, one or more spray arc welds may be used possibly followed by one or more short circuiting weld passes after the surge.

The following are illustrative examples of this welding method:

EXAMPLE I (1-1-C-7)

Total time: 46 seconds.
Shield gas: 40 c.f.h.–M5.
Wire: .045 inch diameter MIG 18.
Purge gas: 12 c.f.h. argon.
Workpiece: 2½ inch O.D. x .180 inch MWSA 226.

| Operation | Spray or short circuit | Weld amps | Weld volts | Wire feed IPM | Roll speed IPM |
|---|---|---|---|---|---|
| Fast roll | Spray | 260 | 22½ | 260 | 42 |
| First pass | do | 260 | 22½ | 260 | 38 |
| Surge | do | 280 | 23 | 300 | 38 |
| Second pass | Short circuit | 215 | 17½ | 220 | 16 |

EXAMPLE II (5-5-C-6)

Total time: 57 seconds.
Wire: 0.045 inch diameter N.S. 2¼% CR, 1% Mo.
Purge gas: 12 c.f.h. argon.
Workpiece: 1¾ inch O.D. SA 213 T-22 with .311 inch wall.
Shield gas: 40 c.f.h. 5M.

| Operation | Spray or short circuit | Weld amps | Weld volts | Wire feed IPM | Roll speed IPM |
|---|---|---|---|---|---|
| Fast roll | Spray | 250 | 23 | 265 | 36 |
| First pass | do | 250 | 23 | 265 | 36 |
| Surge | do | 270 | 23½ | 290 | 36 |
| Second pass | Short circuit | 210 | 17 | 220 | 22 |
| Third pass | do | 210 | 17 | 220 | 16 |

EXAMPLE III (3-3-6-2)

Total time: 67 seconds.
Workpiece: 2⅜ inch O.D. .340 inch MWSA 213 T-2.
Shield gas: 40 c.f.h.–M5.
Purge gas: 12 c.f.h. argon.
Wire: .045 inch diameter A715 (1¼% CR and ½% Mo.).

| Operation | Spray or short circuit | Weld amps | Weld volts | Wire feed IPM | Roll speed IPM |
|---|---|---|---|---|---|
| Fast roll | Spray | 245 | 22½ | 250 | 35 |
| First pass | do | 245 | 22½ | 250 | 30 |
| Surge | do | 280 | 23 | 310 | 30 |
| Second pass | do | 255 | 23½ | 250 | 16 |
| Third pass | do | 255 | 23½ | 250 | 16 |
| Fourth pass | do | 255 | 23½ | 250 | 16 |

EXAMPLE IV (1-1-C-1)

Total time:
  Pass: 1-4—4 min. 23 secs. 5-6—66 seconds each.
Workpiece: 5″ O.D. x .525 MW SA 210.
Shield gas: 40 c.f.h.–M5.
Purge gas: 12 c.f.h.–Argon.
Wire: .045 inch diameter MIG 18.

| Operation | Spray or short circuit | Weld amps | Weld volts | Wire feed IPM | Roll speed IPM |
|---|---|---|---|---|---|
| Fast roll | Spray | 260 | 23 | 280 | 26 |
| First pass | do | 260 | 23 | 280 | 22 |
| Surge | do | 290 | 23½ | 340 | 22 |
| Second pass | do | 265 | 23½–24 | 280 | 14 |
| Third pass | do | 265 | 23½–24 | 280 | 14 |
| Fourth pass | do | 265 | 23½–24 | 280 | 14 |
| Fifth pass | do | 265 | 24½ | 280 | 15 |
| Sixth pass | do | 265 | 24½ | 280 | 15 |

In all the examples but Example II, the roll speed is faster than the initial roll speed which is used for at least the first pass. In Example II, an increase in roll speed during start conditions is not required due to the combination of conditions creating a satisfactory weld start. However, this situation is unusual as the fast start roll speed usually must be higher than the initial roll speed.

In all the examples, the wire feed rate is increased during the surge. However, the purpose is to achieve penetration and this is, in certain situations such as small thin-walled tubing, obtained by not increasing the surge wire feed speed but by slowing down the surge roll speed.

Also, as a general rule, the surge arc voltage is increased over the initial arc voltage. This situation is borne out in all four of the above examples. However, retaining the surge arc voltage substantially equal with the initial arc voltage may be used under specific conditions such as a reduced surge roll speed.

LIMIT SWITCH CONTROL ASSEMBLY FIRST EMBODIMENT

In the description of the worktable 21, is was pointed out that the right front drive shaft 41 was connected to one of two limit switch assemblies 115, 117. In FIG. 4 is shown the first embodiment 115 of the two limit switch assemblies 115, 117. The limit switch control assembly 115 may be located either on or alongside the worktable 21 to coordinate the mechanical operations of the worktable 21 in rolling the workpiece W with the electrical circuitry to be described later. As was previously indicated, the worktable 21 can be constructed without being split into a left portion 33 and a right portion 35. The limit switch control assembly 115 is preferably used with such a simplified version of the worktable 21 due to the need for individual set-up, but it may be used with the split worktable 21 as shown in FIGS. 1, 2, 3.

Referring to FIG. 4, a drive wheel 135 is shown mounted a shaft 137. This shaft 137 is connected, for example, by a mechanical or electrical coupling means (not shown) to the right front shaft 41.

A solenoid (not shown) forces the drive wheel 135 against a friction wheel 139 made preferably of rubber. The drive wheel 135 as explained drives the friction wheel 139 in accordance with the rotation of the workpiece W by rollers 46. The friction wheel 139 is mounted on a shaft 141 on which is mounted a pinion 143. A rack 145 which extends vertically up and down is engaged by the pinion 143. Thus, as the pinion 143 is rotated, the rack 145 moves up. Mounted on the end of the shaft 41 on which the friction wheel 139 and pinion 143 are mounted is a small gear 147 which engages a large gear 149. The gear 149 is mounted on an idling shaft 151 along with a chain gear 153. Secured to the chain gear 153 is a chain 155 which extends vertically downward with a spring 157 mounted between the lower end of the chain 155 and a fixed mounting 159 which is secured to the worktable 21 or other structure located near the worktable 21. As the rack is moved upwardly, the chain 155 is wound about the chain gear 153 against the pull of the spring 157. When the solenoid (not shown) releases the drive wheel 135, the pull of the spring 157 returns the rack 145 to its lower or starting position. Mounted on a frame 161 are a series of four limit switches 163, 165, 167, 169 which are struck by a cam 171 on the rack 145 as the rack 145 moves upwardly. These limit switches 163, 165, 167, 169 are electrically included within the circuit shown in FIGS. 5 and 5A and their functions will be made clear in the description of the electrical circuitry to follow. However, it should be pointed out that a change in the diameter of the workpiece W affects the required spacing between the limit switches 163, 165, 167, 169 on the frame 161, and the limit switches 163, 165, 167, 169 are mounted in a manner so that they can be readily repositioned. Where the worktable is split and tubes of different sizes are used, the size of the workpiece being rotated by the right front drive shaft will control the positioning of the limit switches.

ELECTRICAL CIRCUIT—FIRST EMBODIMENT

Electrical energy is supplied to the control circuit shown in FIGS. 5 and 5A from a 110 volt AC source. Initial start-up of the electrical circuit is achieved by closing a main double pole switch 175. Fuses 177 are located in the circuit to break the circuit in the event of overload. Closing of the main double pole switch 175 immediately energizes a fan motor 179 in the welding controls used to cool the control box (not shown) in which the circuit is located. Similarly, a power indicator light 181 is also immediately lighted.

As soon as welding is to be commenced, a welding switch 183 which has two poles is closed. In series with the welding switch 183 is a normally-closed contact 185 and a water pressure contact 187 which is closed providing cooling water pressure is applied. This, of course, is essential to protect the welding torch 64 in the event the water supply is turned off. With the normally-closed contact 185 and the water pressure contact 187 closed, one leg 190 of the welding switch 183 energizes a relay 189 which activates the roll motor or motors 99, 107 by closing a contact (not shown) in the roll motor circuit. Independent operation of the roller motors 99, 107 can be achieved by use of a manual switch 191. The other leg 193 of the welding switch 183 connects with a coil 195 which closes a normally-open contact 197. As the coil 195 is energized, so is a time delay relay 199, which, after about seven seconds, closes a normally-open contact 201 and opens a normally-closed contact 203. Since the normally-open contact 197 has been closed by the coil 195 and as soon as the normally-open contact 201 has been closed by the time delay relay 199, a relay 205 is energized through a normally-closed contact 207.

When the coil 195 closes the normally-open contact 197, a gas relay 209 and water relay 211 are energized through the normally-closed contact 203. The contact 203 is opened after a brief period by the relay 199, but the relay 199 also closes the normally-open contact 201 energizing the relay 205. The relay 205 closes a normally-open contact 213 in parallel with a post purge time delay relay 215 and closes a normally-open contact 217 in parallel with a post arc voltage time delay relay 219. The closing of the contact 213 and the contact 217 energize the relay 215 and the relay 219 respectively, but the time delay effect of the relays 215, 219 does not begin until the contacts 213, 217 are reopened. Energizing the relay 215 closes a normally-open contact 221 continuing operation of the gas relay 209 and the water relay 211. Therefore, it can be seen that when the contact 203 is opened, the contact 221 is closed, continuing the operation of the gas relay 209 and the water relay 211. The contact 203 thus provides preoperation flow of shielding gas and cooling water while the contact 221 provides post operation flow of shielding gas and cooling water.

The relay 205 also closes a normally-open contact 222 in a portion of the circuit shown in FIG. 5A and later to be explained.

Immediately upon closing the contact 217, a normally-open contact 223 (FIG. 10) is closed energizing a relay 224 in the welding power supply thereby supplying welding power to the welding wire 66.

The contact 221 is located in a line 225 and a manual switch 227 is located in another parallel line 229. A crossover line 231 connects the lines 225, 229. This permits both the water relay 211 and the gas relay 209 to be operated either manually by the switch 227 or automatically by the contact 221.

When the contact 201 is closed, either a relay 233 or a relay 235 are energized depending upon the position of a reversing switch 237. If the reversing switch 237 is set to energize the relay 233, forward feeding of the welding wire 66 is obtained by closing normally-open contacts 239, 241 and opening a normally-closed contact 243 (FIG. 7). With the reversing switch 237 in the opposite position to energize the relay 235, normally-open contacts 245, 247 are closed and a normally-closed contact 249 is opened (FIG. 7). In this way, the current flow through an armature means 251 of the wire drive assembly 65 is reversed. A resistor 253 is in parallel with the armature 251 when not in use and serves to provide dynamic braking.

When the welding wire 66 contacts the workpiece W, welding current which includes the welding wire 66 is completed. A current relay (not shown) in the welding arc circuit which includes the wire 66 closes a normally-open contact 155 which energizes a relay 257. The relay 257 closes a normally-open contact 259 which shorts across the normally-open contact 255 closed by the current relay (not shown). Simultaneously with the energizing of the relay 257, a time delay relay 261 is energized. The time delay relay 261 is an overall timer which is set according to the diameter of the workpiece W and the number of passes desired. When the time delay relay 261 has timed out, the normally-open contact 197, which was closed by the coil 195 is opened, deactivating the control circuit.

It has been pointed out that at the closing of the weld start switch 183, the relay 189 begins rotation of the roll motor means which is illustrated in FIG. 2 as the synchronized roll motors 99, 107. The roll motors 99, 107 are of DC design. In a worktable which was not split for butt welding two workpiece portions W of different diameters, only one roll motor would be used. DC motors are controlled as to speed by potentiometers. In FIG. 8 is shown a speed control circuit for inclusion in the motor speed control circuit for actuating the roll speed from the circuitry of FIG. 5 in accordance with the method already described.

In the method it was explained, that when the welding arc is struck, the workpiece W is rolling at an increased rate of speed over the rate of roll selected for the first pass so as to assure a smooth weld introduction. However, this fast roll start is brief and the roll speed, shortly after the welding arc is struck reverts to the selected first pass roll rate.

Accordingly, once the arc is struck and the normally-open contacts 255, 259 shown in FIG. 5 are closed, a relay 263 shown in FIG. 5A is energized. In FIG. 8 it can be seen that a fast start potentiometer 264 will control the roll speed rate through a normally-closed contact 265 and a normally-closed contact 267 as well as through a normally-closed contact 269 and a normally-closed contact 271. Neither a subsequent pass potentiometer 273 or a surge potentiometer 275 can control due to a normally-open contact 277 and a normally-open contact 279. An initial pass potentiometer 280 is isolated by a normally-open contact 281 and a normally-open contact 283.

After a predetermined period of time selected in accordance with the length of fast roll start desired, the time delay relay 263 opens the two normally-closed contacts 265, 267 and closes the two normally-open contacts 281, 283. In this manner, the fast roll potentiometer 264 is isolated and the initial pass potentiometer 280 is placed in operation within the roll speed circuit. The initial pass potentiometer 280 is set for a roll speed consistent with normal welding operation which, as previously stated, is a rotational speed lower than the fast roll speed.

Simultaneously with the energizing of the time delay relay 261 and the time delay relay 263, a relay 284 is energized which opens a normally-closed contact 285 and a normally-closed contact 286 in series with an inching wire feed potentiometer 287 which is part of the control circuit shown in FIG. 6 used to feed the welding wire 66 in conjunction with the circuitry of FIGS. 5 and 5A. The inching potentiometer 287 is used for setting the rate of wire feed during inching prior to striking the welding arc. The relay 284 also closes a normally-open contact 288 and a normally-open contact 289 thereby placing wire feed rate control in an initial pass potentiometer 290. Since the relay 284 does not include any time delay, the wire feed rate is changed prior to the fast roll start.

As soon as the contacts 255, 259 are closed, a solenoid relay 291 energizes the solenoid (not shown) which forces the friction wheel 139 against the drive wheel 135 beginning the operation of the limit switch control assembly 115 previously described in relation to FIG. 4. The normally-open contact 222 shown in FIG. 5A has already been closed, as was previously stated, by the relay 205.

Assuming a surge or a surge and a second pass to be desired, a disabling switch 292 is manually closed. Movement of the limit switch control assembly 115, as previously described, causes the limit switch 163 to be closed which lights up a second pass light 293 and a surge light 294. The surge light 294 is illuminated through a normally-closed contact 295. When the second pass light 293 is illuminated, a relay 297 and a relay 299 are also energized.

The relay 297 serves to alter the welding wire voltage and the welding wire feed rate. The initial pass potentiometer (FIG. 6) 290 controls the wire feed rate of the first pass when the contacts 288, 289 are closed as previously explained. A surge potentiometer 301 controls the wire feed rate during surge and a subsequent pass potentiometer 303 controls the wire feed rate of subsequent passes after the surge. When the relay 297 is energized, a normally-closed contact 305 and a normally-closed contact 307 are opened eliminating the wire feed rate control by the initial pass potentiometer 290. It should be pointed out that the contacts 288, 289 remain closed since the relay 284 remains energized. The relay 297 also closes a normally-open contact 309 and a normally-open contact 311 making wire feed rate control available to both the surge potentiometer 301 and the subsequent pass potentiometer 303. However, since a normally-open contact 313 and a normally-open contact 315 are open, the subsequent pass potentiometer 303 is still electrically isolated. Since a normally-closed contact 317 and a normally-closed contact 319 are closed, the surge potentiometer 301 takes over control of the welding wire feed rate from the initial pass potentiometer 290.

The control of the wire voltage is accomplished through the inclusion of the circuit shown in FIG. 9 in place of a single potentiometer usually used in association with the welding power supply for regulating the welding voltage. During the first pass, an initial pass potentiometer 321 has the singular control of the wire voltage through a normally-closed contact 323 and a normally-closed contact 325. The relay 297 which as previously pointed out is energized by the closing of the limit switch 163 used at the conclusion of the first welding pass, opens the normally-closed contacts 323, 325 and closes a normally-open contact 327 and a normally-open contact 329. Since a subsequent pass potentiometer 331 is electrically isolated by a normally-open contact 333 and a normally-open contact 335 while a surge potentiometer 337 is operatively connected through a normally-closed contact 339 and a normally-closed contact 341, wire voltage control is maintained by the surge potentiometer 337.

When the relay 299 as previously pointed out is simultaneously energized with the relay 297, a contact 343 is closed which is parallel with the limit switch 163 assuring, for example, that the relay 297 and the relay 299 as well as the second pass light 293 remain energized.

The basic function of the relay 299 is to change the roll speed from the initial pass rate (FIG. 8) to the surge rate. As was previously explained, control is switched from the fast start potentiometer 264 to the initial pass potentiometer 280 by opening the contacts 265, 267 and closing the contacts 281, 283. The relay 299 opens the normally-closed contacts 269, 271 and closes the normally-open contacts 277, 279. This makes control of roll speed nearly available to either the surge potentiometer 275 or to the subsequent pass potentiometer 273. Since a normally-closed contact 345 and a normally-closed contact 347 are closed and a normally-open contact 347 and a normally-open contact 348 are open, control of the roll speed is passed at this point by the relay 299 to the surge potentiometer 275.

After a predetermined surge period has elapsed, the limit switch 165 is closed thereby energizing a relay 349 and a relay 351. The relay 349 closes a normally-open contact 353 in parallel with the limit switch 165. The relay 349 also opens the normally-closed contact 295 which shuts off the surge light 294.

The relay 351 changes the rate of wire feed and welding wire voltage from the surge operation to subsequent pass conditions. The relay 351 opens the normally-closed contacts 317, 319 (FIG. 6) and closes the normally-open contacts 313, 315, which transfers control of the wire feed rate from the surge potentiometer 301 to the subsequent pass potentiometer 303. The relay 351 also opens the normally-closed contacts 339, 341 (FIG. 9) and closes the normally-open contacts 333, 335 transfering control of the welding wire voltage to the subsequent pass potentiometer 331 from the surge potentiometer 337.

A manual switch 355 is used to either place the energizing of a relay 357 by the limit switch 165 or the limit switch 167. With the switch 355 in the upper position as shown in FIG. 5A, the relay 357 is energized with the relays 349, 351.

The relay 357 transfers, as seen in FIG. 8, the control of the roll speed to the subsequent pass potentiometer 273 from the surge potentiometer 275, by opening the normally-closed contact 345 and the normally-closed contact 346 while closing the normally-open contact 347 and the normally-open contact 348. The relay 357 also closes a normally-open contact 367 which is in parallel with the limit switch 167. Therefore, with the manual switch 355 in the upper position, the limit switch 167 becomes ineffective. When the manual switch 355 is in the lower or opposite position, the above-described operation of the relay 358 occurs upon closing of the limit switch 167. In practice, then, an operator would put the manual switch 355 in the upper position if a change in roll speed were desired when changing from surge conditions to subsequent pass conditions. The lower position for the manual switch 355 would be used if a change in roll speed was not desired in changing from surge conditions to subsequent pass conditions but at some later point which would be set by the position of the limit switch 167 on the limit switch control assembly 115.

A limit switch 169 is closed following the limit switch 167. Closing the limit switch 169 energizes a relay 384 which closes a normally-open contact 371 shorting out the limit switch 169. The relay 384 also opens a normally-closed contact 373 deenergizing the rack solenoid relay 291 causing the limit switch control assembly 115 to return to its starting position.

At this point the relay 261 times out opening the normally-open contact 197. This shuts off the major operation of the circuit and opens the normally-open contact 217 and the normally-open contact 213. The opening of the contact 217 begins the timing out of the relay 219 which retains the welding power to the welding wire for a brief period of time while the relay 219 times out. In this way, the wire has a sufficient period of time at the conclusion of the weld to burn off and not stick in the weld. Similarly, when the contact 213 is opened, the timer 215 begins to time out providing a continuation of shielding gas flow during the timing out period during and beyond the burn off period.

A manual switch 375 is used to energize a relay 377 which closes a contact (not shown) in the welding wire feed circuit which energizes the wire feed assembly 65 shown in FIG. 3 when the inching potentiometer 287 of FIG. 6 is in control of the wire feed rate as previously explained.

In the description of the method in accordance with this invention it is made clear that numerous passes of spray arc are, on occasion, used. Sometimes it is essential that the operation be stopped to allow cooling. Under such circumstances a given quantity of time must elapse before again beginning welding. When a time delay between passes is desired, a manual switch 379 shown top of FIG. 5 is closed after the arc is struck. The switch 379 may also be closed prior to striking the arc, but then a time delay occurs prior to the initial operation. When the arc is struck, the relay 284 opens a normally-closed contact 381 in series with the switch 379. When the relay 284 is deenergized, the contact 381 is reclosed energizing a time delay relay 383 which opens a normally-closed contact 385 and the normally-closed contact 185. The normally-closed contact 185 when open prevents closing of the welding circuit by the weld start switch 183. The contact 385 shuts off an indicator light 387 which is illuminated with the light 181 except with the time delay relay 383 timing out.

LIMIT SWITCH CONTROL—SECOND EMBODIMENT

One of the limitations of the limit switch control assembly 115 and the circuitry described in conjunction with it, is that following the surge operation, it passes into one or more passes which must be the same. If a series of spray arc passes after the surge followed by a short circuiting arc pass or passes is desired, the operation must be shut down and the weld conditions changed before restarting the welding operation.

In the alternate limit switch control assembly 117 of FIG. 11, greater flexibility is achieved. The first pass is usually a spray arc which is followed by a surge. Then no further spray arc pass or up to three more spray arc passes can be dialed into the operation followed by one or more short circuiting arc passes. The short circuiting arc passes can be eliminated if desired. Of course, the same arrangement could be used with more spray arc passes and short circuiting passes by providing more limit switches which is readily possible with this control assembly 117.

It should be kept in mind that this limit switch control assembly could be used with the former circuitry of FIGS. 5 and 5A and the former limit switch control assembly 115 could be used with the circuitry still to be described. The sole limitation of the latter combination is space for the required limit switches. In addition, the second limit switch control assembly 117 offers faster and easier adaptation when changing workpiece size and the form of the welding methods.

A drive wheel 395, shown mounted on a shaft 397 (FIG. 11) is connected to the right front shaft 41 shown in FIG. 2 in a manner similar to the limit switch control 115 previously described. The drive wheel 395, which is preferably a permanent magnet steel disc is in contact with a tube 399 cut from the end of a sample of the workpiece being welded. In other words, the tube is substantially a duplicate of the workpiece being welded. Where two workpiece portions of different diameters are being butt welded, the tube 399 is the same as the workpiece portion being rotated on the right front shaft 41. This of course is essential as the right front shaft is rotating at an angular speed set for that workpiece diameter.

A chuck 401 grips one end of the tubing 399. The other side of the chuck 401 is connected to a magnetic clutch 403. The clutch 403 is connected to the chuck 401 by a shaft 405. Another shaft 407 is connected to a cone-shaped member 409. Between the clutch 403 and the cone-shaped member 409 on the shaft 407 is mounted a pinion 411.

The opposite end of the cone-shaped member 409 is connected to a torque absorbing or stepping motor 413.

A gear 415, which is mounted on an idling shaft 417 engages the pinion 411 and is driven by it. The gear 415 has a diameter eight times larger than the diameter of the pinion 411 and therefore rotates at one-eighth the angular rate of the pinion 411 and the cone-shaped member 409. Mounted on the idling shaft 417 are a series of discs 419 on which are mounted keys 421 to open a series of limit switches 423, 425, 427, 429, 431, 433, 435, 437, adjacent to the discs 419. Since the pinion 411 will rotate eight times before the gear 415, the discs 419 will rotate once for every eight revolutions of the pinion 411. A cam rise 438 is mounted on each of the discs 419 one-eighth of a revolution apart. In this way, each of the discs 419 will trip its respective limit switch 423, 425, 427, 429, 431 as also shown in FIG. 12, transferring the welding circuit into subsequent weld pass controls. A dial 443 (FIG. 12) is used to select the total number of passes as is explained subsequently in relation to the circuit. The cam rise 438 on the discs 419 used with the limit switches 433, 435, 437 are set to determine the number of additional passes similar to the first pass following the surge.

Three limit switches 445, 447, shown in FIG. 12A and 449 are used in conjunction with the cone 409. The first two limit switches, 445, 457 will be set approximately three-fourths of an inch apart to allow for a three-eighth surge before and after the weld start. The position of the limit switches 445, 447 is adjusted by a threaded mechanism 451 to the proper tube size on the cone 409. The limit switch 449 is mounted adjacent the stepping motor 413 to be opened by a cam 450 located on the gear 415.

The threaded mechanism 451 includes a calibrated scale 453 with a threaded shaft 455 along the scale 453 with a wheel 457 for rotating the threaded shaft 455. A block 459 slides along the calibrated scale 453 with the threaded shaft 455 engaging it so as to move the block 459 by revolving the wheel 457. Mounted on the block are the limit switches 445, 447. A cam 461 on the cone 409 engages the limit switches 445, 447.

At the end of the passes required to complete the butt joint, the magnetic clutch 403 is opened and the torque absorbing motor 413 returns the assembly 117 to its initial position at which point the limit switch 449 is opened.

ELECTRICAL CIRCUIT—SECOND EMBODIMENT

Electrical power is initially supplied to the circuit by closing switches 469. The entire control circuit is fused by means of fuses 471. Upon closing the switches 469, a power light 473 is illuminated.

When commencing a welding operation, a weld start switch 475 is closed. Assuming the cooling water required by the welding torch is on, a water pressure switch 477 will be closed. Since a contact 479 is normally closed, a relay 481 is energized. The relay 481, when energized, closes a normally-open contact 483 and a normally-open contact 485 as well as a normally-open contact 487 and a normally-open contact 489.

Prior to commencing welding, the total number of welding passes must be selected. The pass selector switch 443, previously mentioned, is positioned at a predetermined setting. The pass selector switch has six settings. The numeral designating each setting indicates the total number of passes provided by that setting. The higher the number of passes desired, the greater the number of limit switches 423, 425, 427, 429, 431, which are bypassed through the pass selector switch 443. With the pass selector switch 443 in position 1, no circuit exists through the pass thus shutting off the circuit after the root pass and surge. In position 2, as shown, the limit switch 423 is placed in the circuit and is opened by a disc 419 after the second pass. Each additional pass desired thereafter requires addition of the limit switches 425, 427, 429, 431 in sequence. In this manner, the greater the number of passes set into the pass selector switch 443, the greater the number of limit switches 423, 425, 427, 429, 431 that can be opened without breaking the circuit.

Since a weld stop switch 491, which is located in series with the limit switches 423, 425, 427, 429, 431, is normally closed, the closing of the contact 483 also in series with the limit switches, permits the automatic reopening of the weld start switch 475. The closing of the contact 485 energizes a time delay relay 493, which closes the contact 223 in the welding power supply, shown in FIG. 10 and as disclosed with reference to the prior circuit of FIGS. 5 and 5A, thereby supplying welding power to the welding electrode 64. The closing of the contact 485 supplies power to but does not energize a relay 495. When energized, as will be explained later, the relay 495 closes the contact 497 thereby continuing the supply of electrical power to both the relay 493 and relay 495 even with the contact 485 open.

Figure 13:
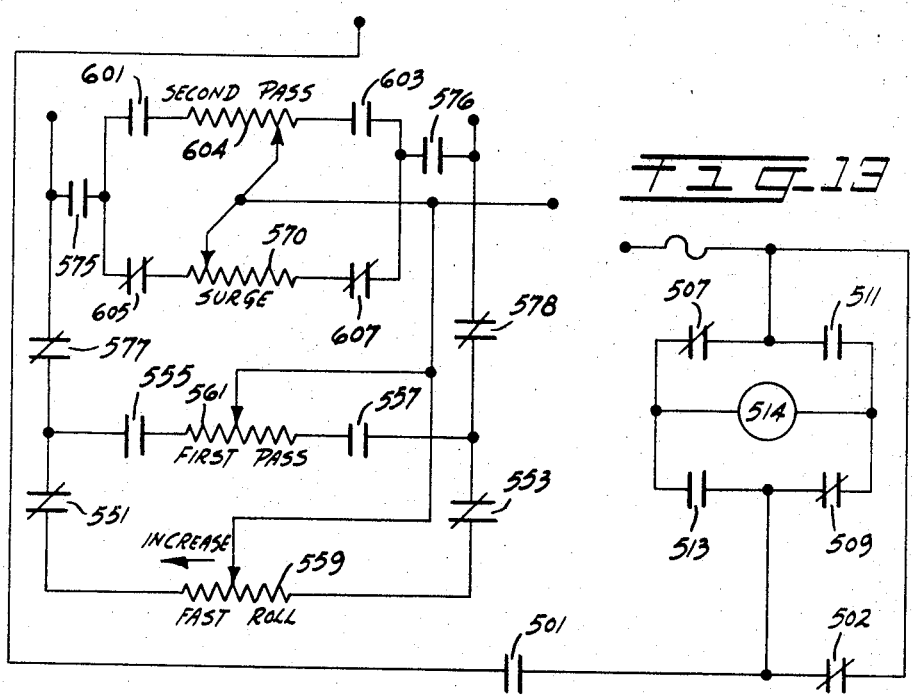
FIG. 13 is a schematic representation of a control circuit used with the roll speed control in accordance with FIG. 12.

Closing the contacts 487, 489 energizes a relay 499 and a roll motor relay 500 which energizes the roll motors 99, 107 shown in FIG. 2 by closing normally-open contact 501 and opening a normally-closed contact 502 shown in FIG. 13. Should a reversing switch 503 be moved to the reverse position, so labeled in FIG. 12, a reverse wire feed relay 505 is energized. As can be seen in FIG. 13, the relay 505 opens a normally-closed contact 507 and a normally-closed contact 509 and closes a normally-open contact 511 and a normally-open contact 513, thereby reversing the direct current flow through the armature means 514 of the roll motors 99, 107. The circuitry of FIG. 13 is used with the circuitry of FIGS. 12 and 12A in a manner similar to the use of FIG. 8 with the circuitry of FIGS. 5 and 5A. The roll motors 99, 107 may also be energized manually through a roll switch 515. The reversing switch 503 operates the same with either the manual roll switch 515 or automatic operation.

Energizing the relay 495 also closes a contact 517 which energizes a water relay 519 to turn on the flow of cooling water and also energizes a shielding gas relay 521 to turn on the flow of shielding gas. This may be manually achieved by a switch 522.

As previously stated, closing the contacts 487, 489 energizes the relay 499. This closes a normally-open contact 523 and a normally-open contact 525 which energizes both a relay 527 and a wire drive relay 529. The relay 527 closes a contact 531 located across the relay 493 and when closed energizes the relay 493 as previously mentioned, and prevents the relay 493 from timing out until the contact 531 is reopened. When the contact 531 is reopened, the relay 493 begins timing out retaining welding power on for a brief period at the conclusion of the weld to burn the wire stub off. The relay 527 also closes a contact 533 located across the relay 495 to energize the relay 495 and to prevent the relay 495 from timing out until the contact 533 is reopened. When the contact 533 is reopened, the relay 495 begins to time out to continue the flow of shielding gas during and beyond the stub burn-off period mentioned above as provided by the relay 493.

In the wire drive control provided with the consumable electrode welding assembly 47, the circuit as shown in FIG. 7, which was also used with FIGS. 5 and 5A, is used in place of just the wire drive motor armature 251. When the wire drive relay 529 is energized by the closing of the contact 523, the normally-open contacts 239, 241 are closed (FIG. 7) and the normally-closed contact 243 is opened and the wire is driven into the weld or, as it is generally stated, the welding wire is driven forward or down. Driving the welding wire forward can also be achieved by placing a wire inching switch 535 in the forward position so as to manually energize the wire drive relay 529. The wire inching switch 535 can also be moved to another position, namely, the reverse position to energize a relay 537 which closes the normally-open contacts 245, 247 and opens the normally-closed contact 249 thereby reversing the wire drive motor armature 251 and pulling the welding wire 66 upwardly. Operation of the relay 537 can only be achieved by the manual inching switch 535 while the forward wire drive relay 529 can be operated either manually by the switch 535 or automatically through the contact 523.

Located in series with the welding arc is a current relay (not shown) which closes a normally-open contact 539 shown in FIG. 12A thereby energizing a relay 541 to close a contact 543 thereby locking the circuit around the contact 539. A test switch 545 is located in parallel with the contact 539 and the contact 543 for manual testing purposes.

At the same time that the relay 541 is energized, a relay 547 and a time delay relay 549 are energized. The time delay relay 549 controls the shift from a fast roll start to the first weld pass. The time delay relay 549, after a predetermined brief time period, opens a normally-closed contact 551 and a normally-closed contact 553 (FIG. 13) and closes a normally-open contact 555 and a normally-open contact 557 which transfer control of the roll speed from a fast start potentiometer 559 to an initial pass potentiometer 561.

The relay 547 opens the normally-closed contacts 285, 286 shown in FIG. 6 in series with the inching potentiometer 287 which controls the wire feed rate during inching of the wire 66 prior to an arc being struck.

When the cone member 409 of the limit switch control assembly 117 strikes the first limit switch 445, the circuit begins the surge portion of the weld. A manual switch 563 in series with the limit switch 445 is normally closed and is used when open to remove all operation after the initial pass including the surge from the welding operation. With the limit switch 445 closed, a surge light 565 is illuminated and a relay 567 and relay 569 are energized. A relay 571 cannot yet be energized due to a normally-open contact 573.

The relay 567 serves the general purpose of changing the welding wire or arc voltage during the various phases of the welding operation and the wire feed rate. The relay 567 opens the contacts 323, 325 (FIG. 9) and closes the contacts 327, 329. Since the contacts 333, 335 are normally open and the contacts 339, 341 are normally closed, the surge potentiometer 337 controls the arc voltage. Similarly, the relay 567 closes the contacts 309, 311 while opening the contacts 305, 307 (FIG. 6) to remove control of the wire feed rate from the initial pass potentiometer 290. Since the surge potentiometer 301 is in series with the normally closed contacts 317, 319 and the contacts 313, 315 in series with the subsequent pass potentiometer 303 are normally open. The subsequent pass potentiometer 303 remains inactive, and the surge potentiometer 301 controls the wire feed rate.

The relay 569 closes a normally-open contact 574 to bypass the limit switch 445. The relay 569 also places control in a surge potentiometer 570 (FIG. 13) by closing a normally-open contact 575 and a normally-open contact 576 and opens a normally-closed contact 577 and a normally-closed contact 578.

At the conclusion of the surge operation, the second limit switch 447 is closed by the cone 409 of the limit switch control 117 which, as a result, energizes a relay 579. The relay 579 opens a normally-closed contact 580 thereby disconnecting the limit switch 447 while closing a normally-open contact 581 to retain the relay 579 in an energized state. The relay 579 also closes the normally-open contact 573 to energize the relay 571 and opens a normally-closed contact 583 while also closing a normally-open contact 585 in parallel with the contact 574 and in parallel with the limit switch 445. With the normally-closed contact 583 open, all operation energized through either the contact 585 or the contact 574 must also be energized through a sequence selector switch 587.

With the contact 573 closed, a relay 571 is energized which closes a contact 589. However, a relay 591 and a relay 593 still cannot be energized unless the sequence selector switch 587 is in the zero position meaning that only the initial spray arc prior to the surge is desired or the required number of the limit switches 433, 435, 437 have been closed by completion of the present number of added spray arc passes.

After the surge, spray arc passes will continue until the circuitry through the sequence selector switch 587 is closed by the cam discs 419 striking whatever of the limit switches 433, 435, 437 are located in the circuit by the position of the sequence selector switch 587. For example, at poistion 1 the limit switch 433 is the only one included and by closing it the transfer to the short circuiting arc pass is accomplished after one pass of spray arc following the initial spray arc pass and the surge. If in position 2, which provides two additional spray arc passes, the limit switch 433 and the limit switch 435 must be closed before the change to a short circuiting arc welding. If in the position 3, used when three additional passes are desired, the limit switch 437 must also be closed.

With the selector switch circuitry closed, the relay 571 is energized since the contact 573 is closed by the already energized relay 579. The relay 571 closes a contact 589 to energize the relay 591, the relay 593, and illuminate a second pass light 595. Should a manual switch 597 be located in its upper position, a relay 599 will also be energized.

The relay 591 opens a normally-closed contact 602 which prevents the surge light 565 from again becoming illuminated even though the relay 567, the relay 569 and the relay 571 are again energized.

The relay 593 controls the wire feed rate and the wire voltage. As seen in FIG. 6, by closing the contacts 313, 315 and opening the contacts 317, 319, the subsequent pass potentiometer 303 takes control of the wire feed rate since the relay 567 has again been energized to the contacts 305, 307 thereby closing the contacts 309, 311. Similarly, in FIG. 9, by opening the contacts 339, 341 and closing the contacts 333, 335 with the relay 567 again opening the contacts 323, 325 and closing the contacts 327, 329, the wire voltage is controlled by the subsequent pass potentiometer 331. If the switch 597 is in its upper position to energize the relay 599, then the relay 599 closes a normally-open contact 601 and a normally-open contact 603 shown in FIG. 13 to place control in a subsequent pass potentiometer 604 while opening a normally-closed contact 605 and a normally-closed contact 607. The relay 599 also closes a normally-open contact 608 shorting out the limit switch 449. It, of course, should be understood that the relay 549 has retained the contacts 577, 578. Should the manual switch 597 be in the lower position, the relay 599 will not be energized until the limit switch 449 is closed. This permits the roll speed to be the same during the short circuiting arc pass as it is during the spray arc pass or to change. If a change in roll speed is not used for the short arc pass, it may be used for a change of roll speed for a later pass.

When the last of the limit switches 423, 425, 427, 429, 431 connected through the total pass selector 443 has been opened, the operation ceases.

At the conclusion of the weld, the time delay relay 493 times out after the opening of the contact 531 to continue wire voltage so as to burn off the wire stub. Similarly, the time delay relay 495 times out after the opening of the contact 533 to continue the flow of shielding gas during the stub burn-off.

When the relay 541 is energized, it closes a normally-open contact 609, and a normally-open contact 611 shown top of FIG. 12, energizing a rectifier 613 with a capacitor 615 across it along with a rack solenoid 617. This engages (FIG. 11) the magnetic wheel 395 against the tube member 399.

It was pointed out with the prior electrical control circuit shown in FIGS. 5 and 5A that a time delay can be obtained between passes. Similarly, in FIGS. 12 and 12A, a manual switch 619 is closed after the arc is struck. The switch 619 may also be closed prior to striking the arc, but then a time delay occurs prior to the initial operation. When the arc is struck, the relay 541 opens a normally-closed contact 621 in series with the switch 619. When the relay 541 is deenergized, as previously explained, the contact 621 is reclosed energizing a time delay relay 623 which opens a normally-closed contact 627 and the normally-closed contact 479. The normally, closed contact 479, when open, prevents closing of the welding circuit by the weld start switch 475. The contact 627 shuts off an indicator light 629.

The relay 527 also opens a normally-closed contact 631 and normally-closed contact 633 deenergizing the stepping motor 413 and the circuit across it which includes a resistor 632 and a capacitor 635. The stepping motor 413 is also deenergized when the relay 547 opens a normally-closed contact 637 in series with the stepping motor 413. The limit switch 449 serves to deenergize the stepping motor when in its initial position.

Although the invention has been described in its preferred form with a certain degree of particularity, it is understood that the present disclosure of the preferred form has been made only by way of example and that numerous changes in the details of construction and operation and the combination and arrangement of parts as well as method steps may be resorted to without departing from the spirit and the scope of the invention as hereinafter claimed.

What is claimed is:

1. A method for butt welding two tubular workpiece portions together comprising:

aligning the two tubular workpiece portions end to end to form a joint;

then striking a gas-shielded arc at an initial arc voltage from a consumable electrode to the joint while rotating the two workpiece portions in relation to the consumable electrode at a starting roll speed for a minor portion of the circumference of the joint while feeding the consumable electrode into the arc at an initial electrode feeding speed, said roll speed being fast enough to form a smooth weld introduction;

then, while continuing the gas-shielded arc at substantially the initial arc voltage rotating the two workpiece portions in relation to the consumable electrode at an initial roll speed for the remainder of the circumference of the joint and continuing the feeding of the consumable electrode into the arc at the initial electrode feeding speed, said initial roll speed being such that weld penetration is achieved;

then continuing the gas-shielded arc at a surge arc voltage while rotating the two workpiece portions in relation to the consumable electrode at a surge roll speed for a small portion of the circumference of the joint including said minor portion with said weld introduction and while feeding the consumable electrode into the arc at a surge electrode feeding speed, the surge electrode feeding speed being higher than the initial electrode feeding speed to penetrate the arc for the minor portion of the circumference of the joint;

then continuing the gas-shielded arc at a subsequent arc voltage while rotating the two workpiece portions in relation to the consumable electrode at a subsequent roll speed for the remainder of the circumference of the joint and while feeding the consumable electrode into the arc at a subsequent electrode feeding speed.

2. A method for butt welding according to claim 1 wherein the starting roll speed is faster than the initial roll speed.

3. A method for butt welding according to claim 1 wherein the starting roll speed is substantially the same as the initial roll speed.

4. A method for butt welding according to claim 1 wherein the surge arc voltage is higher than the initial arc voltage.

5. A method for butt welding according to claim 1 wherein the arc at the initial arc voltage and the surge arc voltage is a spray type metallic transfer arc.

6. A method for butt welding according to claim 1 wherein the arc at the subsequent arc voltage is a short circuiting type metallic transfer arc.

7. A method for butt welding according to claim 5 wherein the arc at the subsequent arc voltage is a short circuiting type metallic transfer arc.

8. A method for butt welding according to claim 5 wherein the arc at the subsequent arc voltage is a spray type metallic transfer arc.

9. A method for butt welding two tubular workpiece portions together comprising:

aligning the two tubular workpiece portions end to end to form a joint;

then striking a gas-shielded arc at an initial arc voltage from a consumable electrode to the joint while rotating the two workpiece portions in relation to the consumable electrode at a starting roll speed for a minor portion of the circumference of the joint while feeding the consumable electrode into the arc at an initial electrode feeding speed, said starting roll speed being fast enough to form a smooth weld introduction;

then continuing the gas-shielded arc at substantially the initial arc voltage while rotating the two workpiece portions in relation to the consumable electrode at an initial roll speed for the remainder of the circumference of the joint and while continuing feeding the consumable electrode into the arc at the initial electrode feeding speed, said initial roll speed being such that weld penetration is achieved;

then, continuing the gas-shielded arc at a surge arc voltage while rotating the two workpiece portions in relation to the consumable electrode at a surge roll speed for a small portion of the circumference of the joint, including said minor portion with said weld introduction and while feeding the consumable electrode into the arc at a surge electrode feeding speed, the surge electrode feeding speed being higher than the initial electrode feeding speed to penetrate the arc for the minor portion of the circumference of the joint;

then, continuing the gas-shielded arc at the initial arc voltage while rotating the two workpiece portions in relation to the consumable electrode at the initial roll speed for at least the remainder of the circumference of the joint while feeding the consumable electrode into the arc at the initial electrode feeding speed; and then continuing the gas-shielded arc at a subsequent arc voltage while rotating the two workpiece portions in relation to the consumable electrode at a subsequent roll speed for the remainder of the circumference of the joint and while feeding the consumable electrode into the arc at a subsequent electrode feeding speed.

10. A method for butt welding according to claim 9 wherein the arc at the initial arc voltage and the surge arc voltage is a spray type metallic transfer arc.

11. A method for butt welding according to claim 9 wherein the arc at the subsequent arc voltage is a short circuiting type metallic transfer arc.

12. A method for butt welding according to claim 10 wherein the arc at the subsequent arc voltage is a short circuiting type metallic transfer arc.

13. A method for butt welding according to claim 10 wherein the arc at the subsequent arc voltage is a spray type metallic transfer arc.

14. A method for butt welding two tubular workpiece portions together comprising:

aligning the two tubular workpiece portions end to end to form a joint;

then striking a gas-shielded arc at an initial arc voltage from an consumable electrode to the joint while rotating the two workpiece portions in relation to the consumable electrode at a starting roll speed for a minor portion of the circumference of the joint while feeding the consumable electrode into the arc at an initial electrode feeding speed, said starting roll speed being fast enough to form a smooth weld introduction;

then, continuing the gas-shielded arc at substantially the initial arc voltage while rotating the two workpiece portions in relation to the consumable electrode at an initial roll speed for the remainder of the circumference of the joint and while continuing feeding the consumable electrode into the arc at the initial electrode feeding speed, said initial roll speed being such that weld penetration is achieved;

then continuing the gas-shielded arc at a surge arc voltage while rotating the two workpiece portions in relation to the consumable electrode at a surge roll speed for a small portion of the circumference of the joint, including said minor portion with said weld introduction and while feeding the consumable electrode into the arc at a surge electrode feeding speed, the surge roll speed and the surge wire feed speed being varied in relation to one another to obtain increased weld penetration; and then continuing the gas-shielded arc at a subsequent arc voltage while rotating the two workpiece portions in relation to the consumable electrode at a subsequent roll speed for the remainder of the circumference of the joint and while feeding the consumable electrode into the arc at a subsequent electrode feeding speed.

15. A method for butt welding according to claim 14 wherein the surge roll speed is decreased from the initial roll speed.

16. A method for butt welding according to claim 15 wherein the surge electrode speed is higher than the initial electrode speed.

References Cited

UNITED STATES PATENTS

| | | | |
|---|---|---|---|
| 1,278,982 | 9/1918 | Morton | 219—124 |
| 2,951,972 | 9/1960 | Pomazal | 219—131 X |
| 2,979,598 | 4/1961 | Laslo | 219—60 |
| 3,261,960 | 7/1966 | Lehnert | 219—60 |

ANTHONY BARTIS, Primary Examiner

L. A. SCHUTZMAN, Assistant Examiner

U.S. Cl. X.R.

219—124

UNITED STATES PATENT OFFICE
CERTIFICATE OF CORRECTION

Patent No. 3,521,020           Dated July 21, 1970

Inventor(s) John B. Fielder et al.

It is certified that error appears in the above-identified patent and that said Letters Patent are hereby corrected as shown below:

Column 1, line 36, "avaliable" should read -- available --. Column 3, line 5, "circumstance" should read -- circumference --. Column 5, line 34, "oparation" should read -- operation --. Column 7, line 15, "41" should read -- 141 --; line 18, before "gear" insert -- large --. Column 8, line 55, "155" should read -- 255 --. Column 12, line 65, after "449" insert -- , shown in FIG. 12, --; line 66, "457" should read -- 447 --. Column 13, line 51, "disclosed" should read -- discussed --.

Signed and sealed this 1st day of June 1971.

(SEAL)
Attest:

EDWARD M. FLETCHER, JR.        WILLIAM E. SCHUYLER, JR.
Attesting Officer              Commissioner of Patents